Aug. 13, 1968 J. B. THIGPEN 3,396,562
FLARING TOOLHOLDER
Filed Aug. 5, 1966
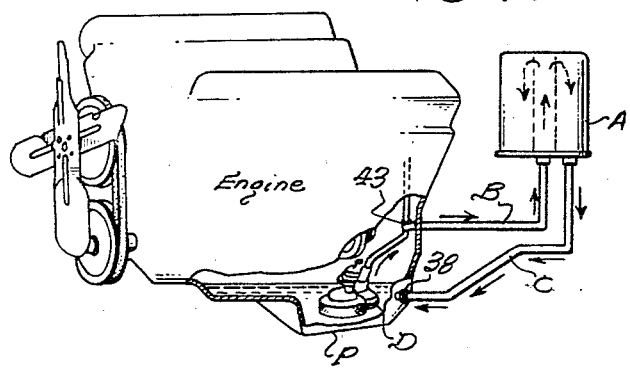
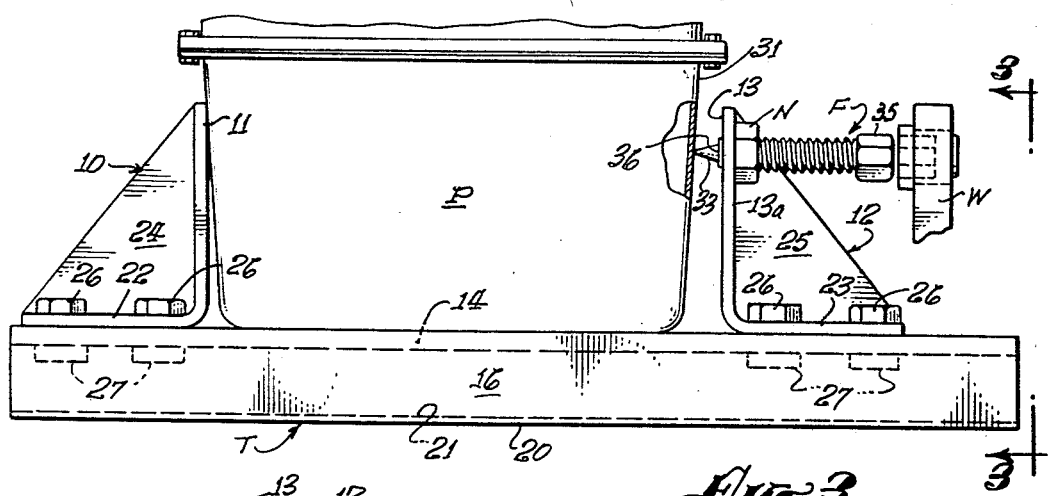
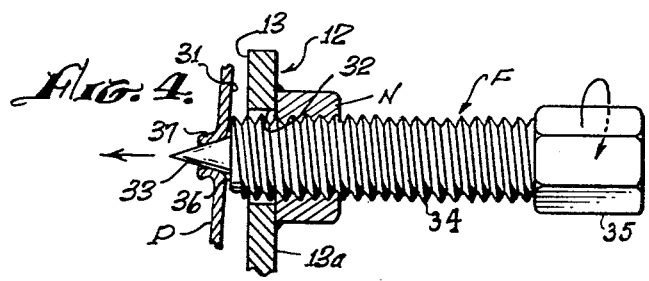
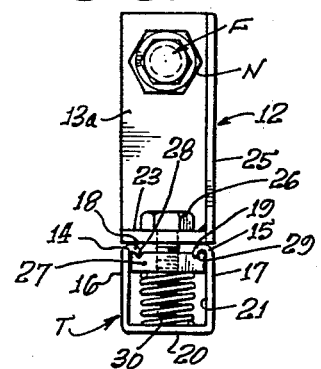
INVENTOR.
JAMES B. THIGPEN,
By Howard L. Johnson
ATTORNEY.

United States Patent Office 3,396,562
Patented Aug. 13, 1968

3,396,562
FLARING TOOLHOLDER
James B. Thigpen, 10471 Christopher St.,
Cypress, Calif. 90630
Filed Aug. 5, 1966, Ser. No. 570,507
2 Claims. (Cl. 72—71)

This invention relates to a small portable positioning device carrying a flaring tool for forming a side aperture in an oil pan while the latter is functionally mounted in place beneath the engine of a motor vehicle. The aperture thus formed may then have an attachment nipple mounted in it for connection to a conduit which is joined to an oil treating or filtering device.

Many motor vehicles are initially distributed from the assembly plant without being equipped with an oil filter; and the individual owner may later wish to have one installed. For such installation, particularly of the here-illustrated by-pass type filter system, it is necessary to connect an oil return line to the oil pan. It is desirable to accomplish this without removing the oil pan or otherwise disassembling the engine or vehicle. An auger cannot be used for such purpose to drill into the pan wall since metal cuttings may drop inside the pan and be circulated later with the oil. Consequently the opening is best formed with a flaring tool which essentially will bend inward (without disintegrating) an encircling conic collar or segmented band of wall material which there remains in place and to or in which an attachment nipple can subsequently be anchored.

The present device which carries such a flaring tool can be temporarily attached to oil pans of varied dimensions by (frictionally) underlying the pan and jointly embracing opposite side walls thereof so that the tool is disposed firmly at the desired height and aperture position; in such location it can then be readily manipulated by a hand tool such as a socket wrench. Apertures thus formed are of uniform size because the flaring tool is shaped to penetrate only a predetermined distance through the pan wall. Consequently a standard size nipple can then be installed.

With such a device thus temporarily anchoring the flaring tool, it is not necessary to place the vehicle on a hoist or even locate it over a pit, since the operator can slide under the vehicle at ground level to mount and demount the device, manipulate the flaring tool and install the attachment nipple and connecting conduit.

Other objects and advantages of the invention will become apparent from the following description of the here-illustrated embodiment of the invention wherein:

FIGURE 1 is a lateral perspective of an engine partly broken away and showing schematically the oil flow through an attached filtering unit which has its return line coupled to an opening made in the oil pan by means of the present flaring-tool-carrying-device.

FIGURE 2 is an elevational view of the device and tool operatively mounted on an oil pan, partly broken away, with a socket wrench shown in phantom in position to cause the flaring tool to penetrate the side wall of the pan.

FIGURE 3 is an end elevational view showing the tool and device as seen along the line 3—3 of FIGURE 2.

FIGURE 4 is an enlarged detail view showinng the tool at position of full penetration of the oil pan wall.

FIGURE 5 is a similar view of the oil pan aperture in which a self-threading nipple has been installed after removal of the flaring tool.

Essentially my device consists of a transverse channel member T and a pair of support members 10, 12 each independently movable along the length of the channel 21 so that the upstanding inner or opposing faces 11, 13 can frictionally engage the corresponding side walls of the oil pan P. The generally rectangular, open-top and open-ended channel is formed with a bottom, usually horizontal wall 20 and mutually parallel, side walls 16, 17 with their upper rims formed by an inturned, inverted-U 14, 15. The free edge of each U thus disposes a longitudinal edge or guide rail 18, 19 inwardly overhanging the channel 21 a short distance below its upper margin or rim (FIG. 3).

Typically each support member 10, 12 is essentially L-shaped and is formed of a flat, upright contact face 11, 13 disposed transverse to the channel length, and a horizontal tab 22, 23 which laterally overlies and is slidable lengthwise along the rims formed by the inverted-U portions of the channel side walls 16, 17. An upright web or gusset 24, 25 connects the two perpendicular L-arms of the respective support members.

Each slide tab 22, 23 is vertically traversed by a pair of bolts 26 each threadedly engaging a corresponding square-sided nut 27 which is located within the channel 21, with the guide edges 18, 19 received in slots 28, 29 formed in its upper face. Dependent from the upper face of each nut 27 is a coil spring 30 which extends to the floor 20 of the channel and is slidable therealong, thus maintaining the slots 28, 29 in sliding engagement with the guide edges 18, 19 when the bolts 26 are loosened in order to relocate the support member 10, 12 along the channel member T. That is, the resilient means 30 prevent misalignment of the guide rails 18, 19 with the corresponding parallel slots 28, 29; such spring also keeps the nut 27 from dropping off the end of the bolt 26 if the latter were unscrewed to such extent.

One of the support members 12 is formed with a horizontally-directed aperture 32 traversing the contact face 13, for example about three inches above the slide tab 23 so that when the channel T is mounted against the bottom of an oil pan P, the aperture 32 will be at a sidewall height of about three inches from the floor of the pan. An internally threaded element or nut N is welded or otherwise fixed to the outer face 13a of the support 12 in alignment with the aperture 32 and carries a flaring tool F threadedly mounted therein. The tool F is characterized by a generally conically pointed end 33 terminating at an annular abutment face 36, a threaded cylindrical shaft 34 and a flared or enlarged polygonal head 35 which is adapted to be engaged by a socket wrench W or similar tool.

Accordingly, after the positioning device is firmly attached to an oil pan at the desired location, the flaring tool F is turned by the wrench until it has penetrated the side wall 31 of the oil pan up to the point of abutment to the stop means 36 against the wall 31. The ruptured wall portion 37 (FIG. 4) will then project inward about the cone 33 in a segmented but generally similar (i.e., conically) shaped configuration. The tool is then withdrawn (i.e., unscrewed through the tapped portion N) and the device demounted from the pan by loosening the nuts 26 of one support member 10 or 12 and sliding that support outward along the channel member T.

An axially apertured nipple fitting 38 (FIG. 5) is then permanently installed in the newly formed opening in the wall 31, by threadedly inserting its conic, threaded length 39 into the ruptured wall 37, again by use of a socket wrench W applied to its polygonal head 40 until the gasket 41 and back-up disk 42 tightly press against the wall 31. The outward projecting head 40 of the fitting is internally threaded for coupling to a return-oil-conduit C coming from the oil treating unit A which is supplied by a by-pass line B from the oil pump D by way of a T fitting 43.

It will be clear to those skilled in the art that various changes of construction and operation may be made within the present inventive concept, having in mind the substitution of functional equivalents, and therefore this disclosure is not to be limited to the precise details shown and described for the presently preferred embodiment by way of example, but it is my intention to hereafter claim the invention broadly aside from the limitations inherent in the prior art.

I claim:

1. A device for the character described for forming a conduit-attachment-aperture in an oil pan which is mounted beneath an engine, said device comprising in combination:

a transverse member adapted to span said oil pan from beneath;

a pair of upstanding support members spaced apart along said transverse member and disposed jointly between them to engage opposite side walls of the oil pan so as temporarily to attach the device therebeneath;

means for adjustably positioning at least one of said support members along said transverse member so as to engage and disengage it from the adjacent side wall of the oil pan in mounting and demounting the device; and a generally conically-ended wall-piercing member having limit means adapted to effect a predetermined length of penetration, being threadedly carried by one of said support members in position to flaringly penetrate the adjacent side wall of the oil pan upon rotational manipulation of the wall-piercing member after the device is thus mounted beneath the oil pan.

2. The device of the preceding claim 1 wherein said transverse member is an open-top channel having parallel, top longitudinal rims each shaped as an inturned inverted-U with the inner, downturned edge of each U thus forming a longitudinal guide rail within the channel, and said pair of upstanding support members are essentially L-shaped, one arm of the L overlaying the top rims of said channel and being slidable therealong, and the other arm of the L being disposed upstanding therefrom, and said means for adjustably positioning said support members includes a nut disposed within said channel immediately beneath said guide rails and formed with a parallel pair of grooves along its upper face disposed for sliding registration with said guide rails, resilient support means located within said channel and disposed to maintain said nut in sliding registration with said guide rails, and a bolt member adjustably securing said overlaying L-arm which is rested upon said channel rims to said resilient-supported nut within the channel, whereby the two are jointly movable lengthwise along the channel in selectively positioning the support member therealong.

References Cited

UNITED STATES PATENTS

| | | | |
|---|---|---|---|
| Re. 25,131 | 3/1962 | Wilson | 72—125 |
| 1,383,840 | 7/1921 | Mueller et al. | 72—71 |
| 1,571,267 | 2/1926 | Hartsock | 72—125 |
| 1,950,154 | 3/1934 | Rosenberg et al. | 72—70 |
| 2,310,083 | 2/1943 | Holmes et al. | 72—325 |
| 2,991,551 | 7/1961 | Fogle et al. | 72—71 |
| 3,234,634 | 2/1966 | Johnson et al. | 72—464 |

CHARLES W. LANHAM, *Primary Examiner.*

K. C. DECKER, *Assistant Examiner.*